Oct. 13, 1942. H. SCOTT-PAINE ET AL 2,298,653
CONTROL GEAR FOR BOATS, AIRCRAFT OR OTHER MOBILE UNITS
Filed July 26, 1940 3 Sheets-Sheet 1
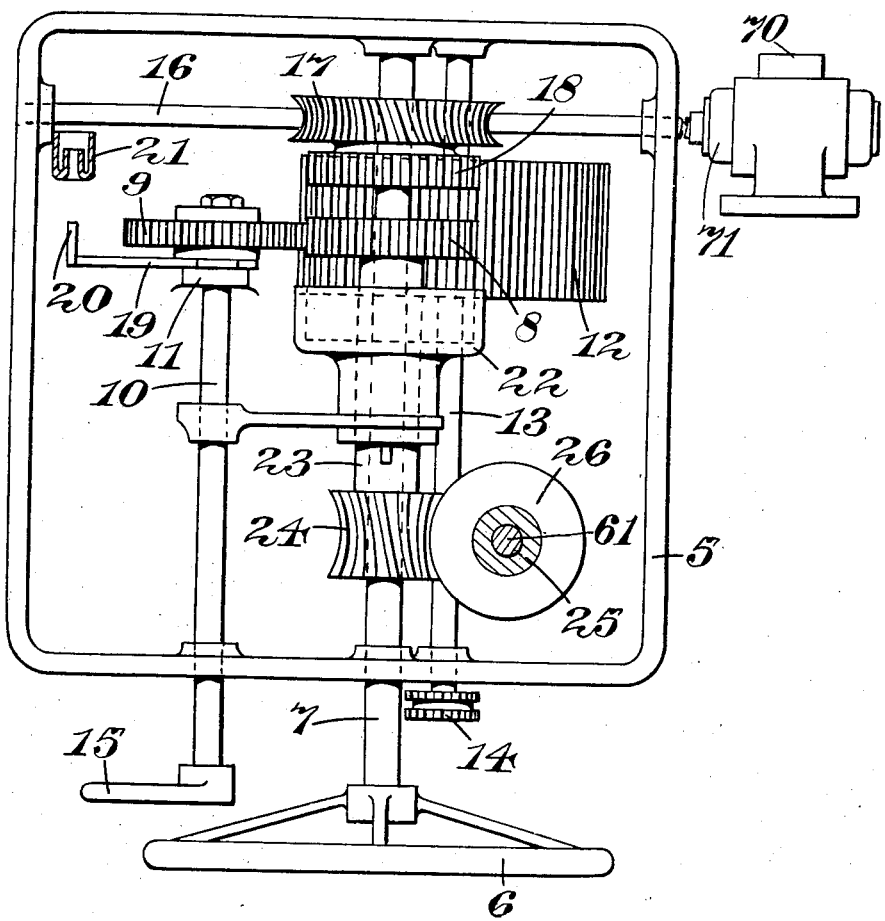

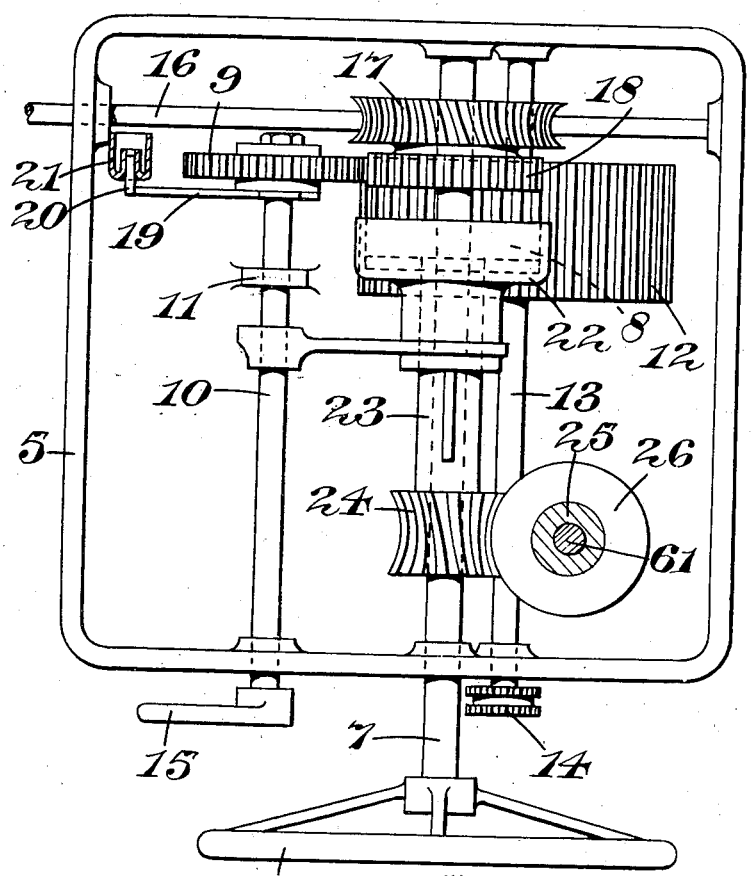
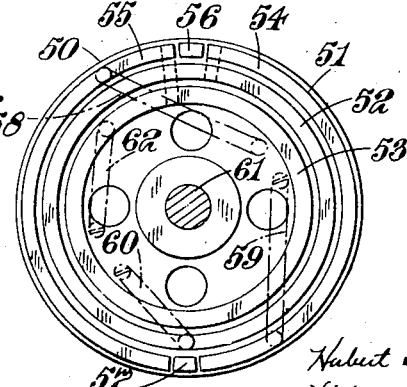

Patented Oct. 13, 1942

2,298,653

UNITED STATES PATENT OFFICE 2,298,653

CONTROL GEAR FOR BOATS, AIRCRAFT, OR OTHER MOBILE UNITS

Hubert Scott-Paine and Victor George Bull, Hythe, Southampton, England; said Bull assignor to said Scott-Paine Application July 26, 1940, Serial No. 347,720
In Great Britain July 27, 1939

7 Claims. (Cl. 114—144)

This invention relates to steering gear for boats, aircraft and other mobile units of the kind comprising a handwheel or lever, a transmission connected with the rudder, a power unit, a control mechanism for said power unit and selector mechanism having two operative positions in one of which the selector mechanism couples the transmission directly with the handwheel or lever and disconnects the power unit completely from the transmission, while in the other operative position, the selector mechanism both couples the handwheel or lever to the control mechanism of the power unit and connects said power unit with said transmission.

According to this invention, a steering gear of the kind referred to above is characterised in that said transmission, which is connected with the rudder, comprises a gear-wheel and an operating pinion in permanent engagement therewith and in that said selector mechanism comprises means for moving said operating pinion in an axial direction between two positions, in one of which it is engaged by a gear-wheel driven by said handwheel and in the other of which it is engaged by a gear-wheel driven by said power unit.

The power unit is preferably a reversible electric motor and the selector mechanism is arranged to couple said handwheel with a control switch for said electric motor during the movement of the operating pinion from the position in which it is in gear with the handwheel to a position in which it is in gear with the motor.

The selector mechanism may also be arranged to operate a main switch in the motor circuit so as to interrupt the circuit when the selector mechanism is moved to bring the driving pinion out of engagement with the electric motor and into engagement with the handwheel.

The aforesaid control switch for the motor may embody a follow-up device in which one movable part moves with the rudder and another movable part moves with the handwheel so that the movement of the first said part starts the power unit which continues to operate until a similar extended movement of the second part by means of the handwheel, stops the power unit. In such an arrangement, the handwheel may be arranged to rotate a contact arranged to co-operate with contact segments which control the field circuit of the reversible motor and which are mounted on a rotatable plate driven by the steering wheel in a direction to bring the plate back to a position in which the contact is disengaged from the contact segments.

According to a further feature of the invention there is also provided an automatic steering control comprising contacts arranged in an alternative circuit controlling the motor, the contacts being operated by a gyroscope control.

One example of the invention is shown in the accompanying drawings in which—

Figure 1 is a plan view of the control gear set for manual steering,

Figure 2 is a similar view of the gear set for electrical operation,

Figure 4:
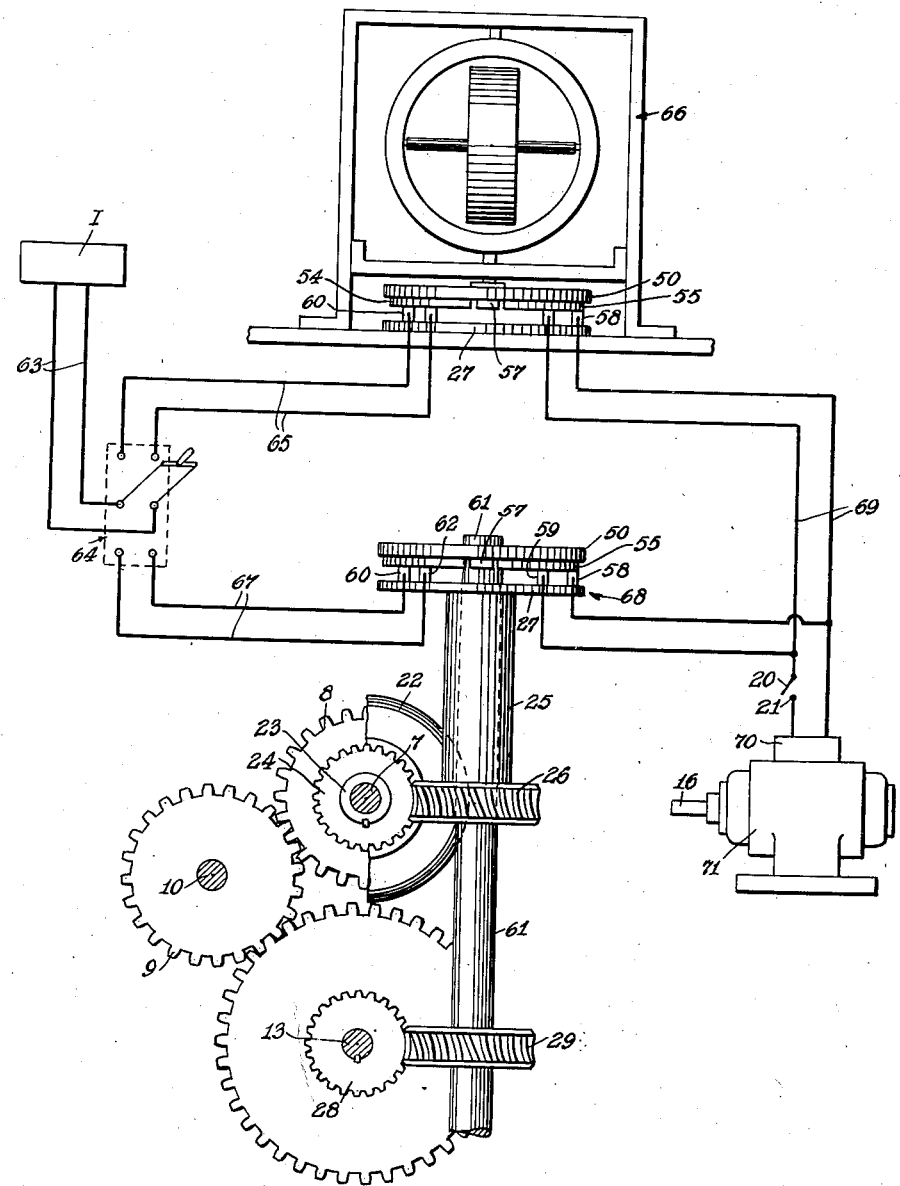

Figure 3 is a detail view on a larger scale of the segment-switch plate used in the electric control circuit, and Figure 4 is a diagrammatic view of an arrangement in which a gyroscopic control may be arranged to displace the hand or power control and also shows the inter-relationship of the gearing, as seen from a point of view at right angles to that of Figures 1 and 2, looking toward the top of said figures.

The gear is housed in a cntrol box 5 in which all the parts are assembled so that the control box forms a unit for assembly in the steering gear. The hand wheel 6 is mounted on a shaft 7 carried in bearings in the box. The shaft 7 carries a pinion 8 fixed to it and this pinion is arranged to mesh with an operating pinion 9 freely rotatable on the rod 10 supported in the box at one end and in the bearings 11 at the other.

The operating pinion 9 is in driving engagement with the large gear wheel 12 fixedly mounted on the driven steering shaft 13 in the box below the shaft 7. The shaft 13 extends to the outside of the box where it carries suitable sprockets 14 for transmitting the drive to the rudders (not shown).

It will be seen therefore that movement of the handwheel 6 operates the rudders through the pinions 8 and 9 and gear wheel 12, driven shaft 13 and sprockets 14.

The rod 10 is slidably mounted in its bearings and is provided with a handle 15 arranged outside the box adjacent the handwheel 6 in any convenient position where it may easily be controlled by the operator, and this handle and shaft provide a control member for changing over from manual to electrical steering.

A reversible electric motor 71 drives the shaft 16 which carries a worm engaging the pinion 17 which is mounted to rotate together with the pinion 18 about the shaft 7. The pinion 18 is clear of engagement with the large gear wheel 12 on the driven shaft 13.

In order to change over from manual to electrical steering the handle 15 is moved in to the position shown in Figure 2, so that the pinion 9 is brought into engagement with the pinion 18 and the drive is transmitted from the motor shaft 16 through the pinions or gear wheels 17, 18, 9, 12 and driven shaft 13 to the rudders.

The rod 10 carries an arm 19 provided with a switch contact 20 arranged to close the main switch 21 of the motor circuit when the member 10 is moved into its inner position.

The rod 10 also carries a sleeve 22 which is mounted to slide axially of, but to rotate with, an inner sleeve 23 freely mounted on the shaft 7. The sleeve 22 carries internal projections arranged to engage the pinion 8 so that when the rod 10 is in its inner position the handwheel drives the sleeve 23 through the shaft 7, pinion 8 and the sleeve 22.

Referring to Figs. 1 and 4, the sleeve 23 carries a worm 24 driving a pinion 26 which is mounted on a hollow shaft 25. The shaft 25 carries a disc 27 of insulating material carrying contacts 58, 59, 60 and 62. The location of these contacts is shown in Fig. 3 in which they appear at the ends of the chain lines which are furthest from the shaft 61.

Mounted on a shaft 61, coaxial with the shaft 25, is a segment switch plate 50 which is of insulating material and carries contact rings 51, 52 and 53, the arrangement of which is shown in Fig. 3. The ring 51 is made up of contact segments 54, 55 with neutral zones 56, 57 between them. One of the contact segments, for example 54, is electrically connected to the ring 52, whereas the other contact segment 55 is connected to the ring 53. In Figure 3, the positions of the contacts 58, 59, 60, 62 on the contact disc in relation to the contact rings 51, 52, 53 on the plate 50 are shown in chain lines. The contact rings 51, 52, 53 and contacts 58, 59, 60, 62 are connected in circuits with solenoids which control the motor field circuit. For example, assuming in Figure 3 the contact 62 is connected to the positive side of the source of supply, then the output contact 58 will also become positive, owing to the fact that it is connected through the contact segment 55 and the ring 53 with the contact 62. Similarly, assuming the contact 60 is connected with the negative side of the supply, then the output contact 59 will also become negative in view of the fact that it is connected through the contact segment 54 and ring 52 with the contact 60. Should, however, the relatively movable plate be moved into a position in which the output contact 58 is connected with the segment ring 54 and the output contact 59 is connected with the segment plate 55, their polarities will be reversed.

It will be seen therefore that when the handle 15 is pushed into the position shown in Figure 2, movement of the handwheel rotates the contact 58 on to one or other of the contact segments 54, 55. The circuit through the motor field is thus established and the rudders are driven from the motor. Movement of the driven shaft 13, however, drives the segment switch plate 50 through worm 28, pinion 29 and shaft 61 (see Fig. 4) until a neutral zone meets a contact on disc 27 (see Fig. 3) and the motor field circuit is interrupted; the rudders are thus moved by an amount corresponding to the amount of movement of the handwheel.

It will be appreciated therefore, that by a simple movement of the control member 15 the steering can be changed from manual to electrical drive and the electrical drive gives quick manoeuvring and tactical steering of the boat to a degree which it would not be possible to obtain by manual steering.

It is a further advantage of the construction that any number of steering positions for electrical control can be established in the boat by the provision of a control box with appropriate connections to the motor and to the rudders.

There is also provided a gyroscopic control for the electric motor, whereby the ship may be maintained on a set course. For this purpose, a similar set of contact plates to those operated by the handwheel 6 are provided, with the exception that either the segment switch plate 50 is fixed while the other plate 27 carrying the contacts is arranged to be moved by the gyroscope, or vice versa. A change-over switch is provided, whereby either the gyro controls may be placed in circuit with a source of current and the steering motor, or the manually controlled power steering may be connected in that circuit. The arrangement is diagrammatically shown in Figure 4, in which the source of current I is connected by leads 63 with a change-over switch 64, whereby the current source may be connected either by leads 65 to the input side of the gyro control 66 or by leads 67 to the input side of the manually controlled power steering control 68. The output sides of the two controls are connected by leads 69 through a polarised relay and solenoid switches 70 with the field circuit of the steering motor 71.

The gyroscope control 66 operates in a manner known per se and the gyroscope itself may be driven either electrically or by compressed air. The gyroscope control may comprise a contact carrying plate 27 which is fixed and a segment switch plate 27 which is moved by the gyroscope. This switching device is a duplicate of the one mounted on and controlled by the concentric shafts 25 and 61. Obviously the plates may be reversed so that the contact carrying plate is moved by the gyroscope and the segment switch plate is fixed. It will be understood that the terms "fixed" and "movable" are relative and that the "fixed" plate is fixed relative to the craft in which it is mounted and moves with it while the "movable" plate is held in a constant compass direction by the gyroscope and hence moves relative to the vessel when the vessel turns. Such relative movement will operate the steering control motor 70 to restore the vessel to its former course in the same manner as the control which is adapted for manual operation.

When the motor is to be gyroscopically controlled, the steering gear is first set for electrical operation, as shown in Figure 2, and the change-over switch 64 (Figure 4) is then moved to put the gyroscope control in circuit and to take out of circuit the manual electrical control 68. On the change-over, the set of contact plates associated with the gyroscope are substituted for those rotated by the movement of shafts 25 and 61 and the remainder of the apparatus operates in the same manner as when manual electrical steering is in effect.

Assuming it is desired to bring the ship on to a new course and to maintain it on that course, and assuming the parts are in the position shown in Figure 2, the change-over switch is so manipulated as to bring the manually controlled power steering control into circuit with the electric motor and current source. Thus, by manipulating the handwheel 6, the rudder may be moved over to the required extent under the power of the motor. When the ship has been brought to the desired course, the change-over switch is moved so as to bring the gyro control into circuit, while the manually controlled power steering control is taken out of circuit. From then onwards, the gyro control maintains the course of the ship. Should there by a deviation in course, certain of the contacts are closed, whereby the steering motor moves the rudder to bring the ship back on to its course.

We claim:

1. A steering control gear comprising a driven steering shaft, a gear wheel fixed thereon, an axially slidable member mounted for movement parallel to said steering shaft, an operating pinion rotatably mounted on said member and permanently meshing with said gear wheel and movable across the width thereof, a hand-controlled operating shaft, a hand-driven pinion rotated thereby and meshing with the operating pinion when both pinions occupy a common plane, a power unit, a power-driven pinion rotated thereby and meshing with the operating pinion when both pinions occupy a common plane, the hand-driven and power-driven pinions being spaced from one another so as to be separately engaged by the operating pinion, a control mechanism for said power unit, a clutch operable to connect said operating shaft to said control mechanism, means operatively connecting said axially slidable member with said clutch whereby movement of said member to engage the operating pinion with the hand-driven pinion disengages said clutch and with the power-driven pinion engages said clutch.

2. A steering control gear comprising a driven steering shaft, a gear wheel fixed thereon, an axially slidable rod mounted for movement parallel to said steering shaft, an operating pinion rotatably mounted on said rod and permanently meshing with said gear wheel and movable across the width thereof, a hand-controlled operating shaft, a hand-driven pinion rotated thereby and meshing with the operating pinion when both pinions occupy a common plane, a reversible electric motor, a power-driven pinion rotated thereby and meshing with the operating pinion when both pinions occupy a common plane, the hand-driven and power-driven pinions being spaced from one another so as to be separately engaged by the operating pinion, a controlling and reversing switch mechanism in circuit with said motor, a clutch operable to connect said operating shaft to said switch mechanism, and means operatively connecting said rod with said clutch whereby movement of said rod to engage the operating pinion with the hand-driven pinion disengages said clutch and with the power-driven pinion engages said clutch.

3. A steering control gear comprising a driven steering shaft, a gear wheel fixed thereon, an axially slidable rod mounted for movement parallel to said steering shaft, an operating pinion rotatably mounted on said rod and permanently meshing with said gear wheel and movable across the width thereof, a hand-controlled operating shaft, a hand-driven pinion rotated thereby and meshing with the operating pinion when both pinions occupy a common plane, a reversible electric motor, a power-driven pinion rotated thereby and meshing with the operating pinion when both pinions occupy a common plane, the hand-driven and power-driven pinions being spaced from one another so as to be separately engaged by the operating pinion, a controlling and reversing switch mechanism in circuit with said motor and having two relatively rotatable contact carrying parts one of which moves with said steering shaft, a clutch operable to connect said operating shaft to the other rotatable part of said switch mechanism, and means operatively connecting said rod with said clutch whereby movement of said rod to engage the operating pinion with the hand-driven pinion disengages said clutch and with the power-driven pinion engages said clutch, said switch mechanism having an open-circuit position and contacts on said relatively rotatable parts adapted to reverse said motor upon movement of said parts from one side of the open-circuit position to the other.

4. A steering control gear comprising a driven steering shaft, a gear wheel fixed thereon, an axially slidable member mounted for movement parallel to said steering shaft, an operating pinion rotatably mounted on said member and permanently meshing with said gear wheel and movable across the width thereof, a hand-controlled operating shaft, a hand-driven pinion rotated thereby and meshing with the operating pinion when both pinions occupy a common plane, a power unit, a power-driven pinion rotated thereby and meshing with the operating pinion when both pinions occupy a common plane, the hand-driven and power-driven pinions being spaced from one another so as to be separately engaged by the operating pinion, a rotatable sleeve surrounding said operating shaft, a control pinion fixed on said sleeve, a control for said power unit driven by said control pinion, a clutch member slidable longitudinally of and non-rotatably mounted on said sleeve, and a connecting member between said axially slidable member and said clutch member, movement of said axially slidable member to engage the operating pinion with the hand-driven pinion disengaging said clutch and with the power-driven pinion engaging said clutch.

5. A steering gear according to claim 4 in which the clutch member comprises a cup-shaped member having internal teeth adapted to engage the teeth of said hand-driven pinion.

6. A steering control gear comprising, a driven steering shaft, a gear wheel fixed thereon, an axially slidable member mounted for movement parallel to said steering shaft, an operating pinion rotatably mounted on said member and permanently meshing with said gear wheel and movable across the width thereof, a hand controlled operating shaft, a hand-driven pinion rotated thereby and meshing with the operating pinion when both pinions occupy a common plane, a reversible electric motor, a power-driven pinion rotated thereby and meshing with the operating pinion when both pinions occupy a common plane, the hand-driven and motor-driven pinions being spaced from one another so as to be separately engaged by the operating pinion upon movement of said axially slidable member, a gyroscopically operated controlling and reversing switch for said motor having two relatively movable sets of contacts, one of said sets being stationary and the other of said sets being controlled gyroscopically, a main switch in the circuit to said motor, and means carried by said axially slidable member for operating said switch, said main switch being closed when the operating pinion is engaged with and opened when it is disengaged from said motor-driven pinion.

7. A steering control gear comprising a driven steering shaft, a gear wheel fixed thereon, an axially slidable member mounted for movement parallel to said steering shaft, an operating pinion rotatably mounted on said member and permanently meshing with said gear wheel and movable across the width thereof, a hand controlled operating shaft, a hand-driven pinion rotated thereby and meshing with the operating pinion when both pinions occupy a common plane, a reversible electric motor, a power-driven pinion rotated thereby and meshing with the operating pinion when both pinions occupy a common plane, the hand-driven and motor-driven pinions being spaced from one another so as to be separately engaged by the operating pinion upon movement of said axially slidable member, a controlling and reversing switch for said motor having two relatively movable contact carrying parts one of which moves with said steering shaft, a clutch operable to connect said operating shaft to the other part of said switch, means connecting said clutch with said axially slidable member, said clutch being engaged upon movement of said operating pinion into engagement with said motor-driven pinion, a gyroscopically operated controlling and reversing switch for said motor having a set of stationary and a set of gyroscopically controlled contacts, a change-over switch adapted to place one or the other of the aforesaid switches in circuit with the motor, and a source of power, a main switch in the circuit to said motor, and means carried by said axially slidable member for operating said switch, said main switch being closed concurrently with the engaging of said clutch.

HUBERT SCOTT-PAINE.
VICTOR GEORGE BULL.